(12) United States Patent
Buse

(10) Patent No.: US 9,533,821 B2
(45) Date of Patent: Jan. 3, 2017

(54) PACKAGE FOR CIGARETTES, AND METHOD FOR PRODUCING SAME

(75) Inventor: Henry Buse, Visselhövede (DE)

(73) Assignee: Focke & Co. (GmbH & Co. KG), Verden (DE)

( * ) Notice: Subject to any disclaimer, the term of this patent is extended or adjusted under 35 U.S.C. 154(b) by 225 days.

(21) Appl. No.: 14/350,568

(22) PCT Filed: Apr. 26, 2012

(86) PCT No.: PCT/EP2012/001802
§ 371 (c)(1),
(2), (4) Date: Jul. 21, 2014

(87) PCT Pub. No.: WO2013/053408
PCT Pub. Date: Apr. 18, 2013

(65) Prior Publication Data
US 2015/0027916 A1      Jan. 29, 2015

(30) Foreign Application Priority Data

Oct. 11, 2011   (DE) .................. 10 2011 115 504
Nov. 25, 2011   (DE) .................. 10 2011 119 344

(51) Int. Cl.
*A24F 15/00*     (2006.01)
*B65D 85/10*     (2006.01)
(Continued)

(52) U.S. Cl.
CPC ............. *B65D 85/1045* (2013.01); *B65B 9/06* (2013.01); *B65B 19/025* (2013.01); *B65B 19/20* (2013.01);
(Continued)

(58) Field of Classification Search
CPC ............ B65D 85/1045; B65D 85/1036; B65D 85/1018; B65D 85/1072; B65D 85/12; B65D 75/5838; B65D 85/1027; B65D 2575/586; A45F 15/00; B65B 19/025; B65B 9/06; B65B 51/306; B65B 19/221; B65B 19/20; B65B 2220/08; B65B 2220/04
(Continued)

(56) References Cited

U.S. PATENT DOCUMENTS 2,879,635 A    9/1957   Brock
3,007,295 A    11/1961  Heinzer
(Continued)

FOREIGN PATENT DOCUMENTS

CN    1224401 A    7/1999
CN    1085605 C    12/1999
(Continued)

OTHER PUBLICATIONS

Deutsches Patent—Und Markenamt (German Patent and Trademark Office), Recherchebericht (Search on priority patent application), (May 8, 2012).
(Continued)

*Primary Examiner* — Jacob K Ackun
*Assistant Examiner* — Rafael Ortiz
(74) *Attorney, Agent, or Firm* — Laurence P. Colton; Smith Tempel Blaha LLC

(57) ABSTRACT

An aroma-tight cigarette pack with an outer pack (12) configured in the form of a hinge-lid box, and also with an inner pack (11) configured in the form of a sealed block with an opening aid which can be used a number of times. The opening aid has a removal opening (51) which extends in a sub-region of an inner front wall (39) and of an adjacent inner end wall (41) and is covered over by a closure label (54) with an adhesively bonding connecting periphery (55). The inner pack (11) has closure seams (37) which are designed in the form of fin seams.

16 Claims, 8 Drawing Sheets

(51) Int. Cl.
  *B65D 85/12*  (2006.01)
  *B65B 19/02*  (2006.01)
  *B65D 75/58*  (2006.01)
  *B65B 9/06*  (2012.01)
  *B65B 51/30*  (2006.01)
  *B65B 19/22*  (2006.01)
  *B65B 19/20*  (2006.01)

(52) U.S. Cl.
  CPC ........... *B65B 19/221* (2013.01); *B65B 51/306* (2013.01); *B65D 75/5838* (2013.01); *B65D 85/1027* (2013.01); *B65B 2220/04* (2013.01); *B65B 2220/08* (2013.01); *B65D 2575/586* (2013.01)

(58) Field of Classification Search
  USPC ................ 206/242, 268, 271, 273–275, 259; 229/87.13
  See application file for complete search history.

(56) References Cited

U.S. PATENT DOCUMENTS

| | | | | |
|---|---|---|---|---|
| 4,303,155 | A * | 12/1981 | Focke | B65D 85/1045 206/264 |
| 5,480,025 | A * | 1/1996 | Draucker | B65D 85/1081 206/246 |
| 6,164,444 | A | 12/2000 | Bray | |
| 8,087,401 | B2 | 1/2012 | Inoue | |
| 2003/0059315 | A1 | 3/2003 | Choi | |
| 2007/0108263 | A1 | 5/2007 | Nash | |
| 2010/0230303 | A1* | 9/2010 | Buse | B65D 5/38 206/268 |
| 2011/0114518 | A1* | 5/2011 | Hein | B65B 19/20 206/268 |

FOREIGN PATENT DOCUMENTS

| | | | |
|---|---|---|---|
| CN | 1461895 A | 12/2003 | |
| CN | 102112378 A | 6/2011 | |
| DE | 2833389 A1 | 2/1980 | |
| DE | 29621226 U1 | 3/1997 | |
| DE | 69908373 T2 | 4/2004 | |
| DE | 202006006992 U1 | 7/2006 | |
| DE | 102007030267 A1 | 1/2009 | |
| DE | 102009060134 A1 | 6/2011 | |
| DE | 102010019867 A1 | 9/2011 | |
| DK | EP 0566521 A1 * | 10/1993 | ............ B65B 9/067 |
| EP | 0007423 A1 | 2/1980 | |
| EP | 0566521 A1 | 10/1993 | |
| EP | 2366637 A1 | 9/2011 | |
| GB | 981118 A | 1/1965 | |
| JP | 2000513686 A | 10/2000 | |
| JP | 2001504069 A | 3/2001 | |
| JP | 2005127307 A | 5/2005 | |
| JP | 2010531279 A | 9/2010 | |
| WO | 9849072 A1 | 11/1998 | |
| WO | 2011009520 A1 | 1/2011 | |
| WO | 2011069575 A1 | 6/2011 | |

OTHER PUBLICATIONS

WIPO/PCT, International Search Report on priority patent application, (Nov. 15, 2012).
State Intellectual Property Office of the People's Republic of China, Notification of the First Office Action (on related application), Jul. 3, 2015.
European Patent Office, Europaischer Recherchenbericht (EPO patent search in related application), Feb. 24, 2015.
Japanese Patent Office, Office Action (in related Japanese patent application), Feb. 24, 2016 (translated into German).
State Intellectual Property Office of the People's Republic of China, Notification of the First Office Action (in a related application), Jun. 29, 2016.

* cited by examiner

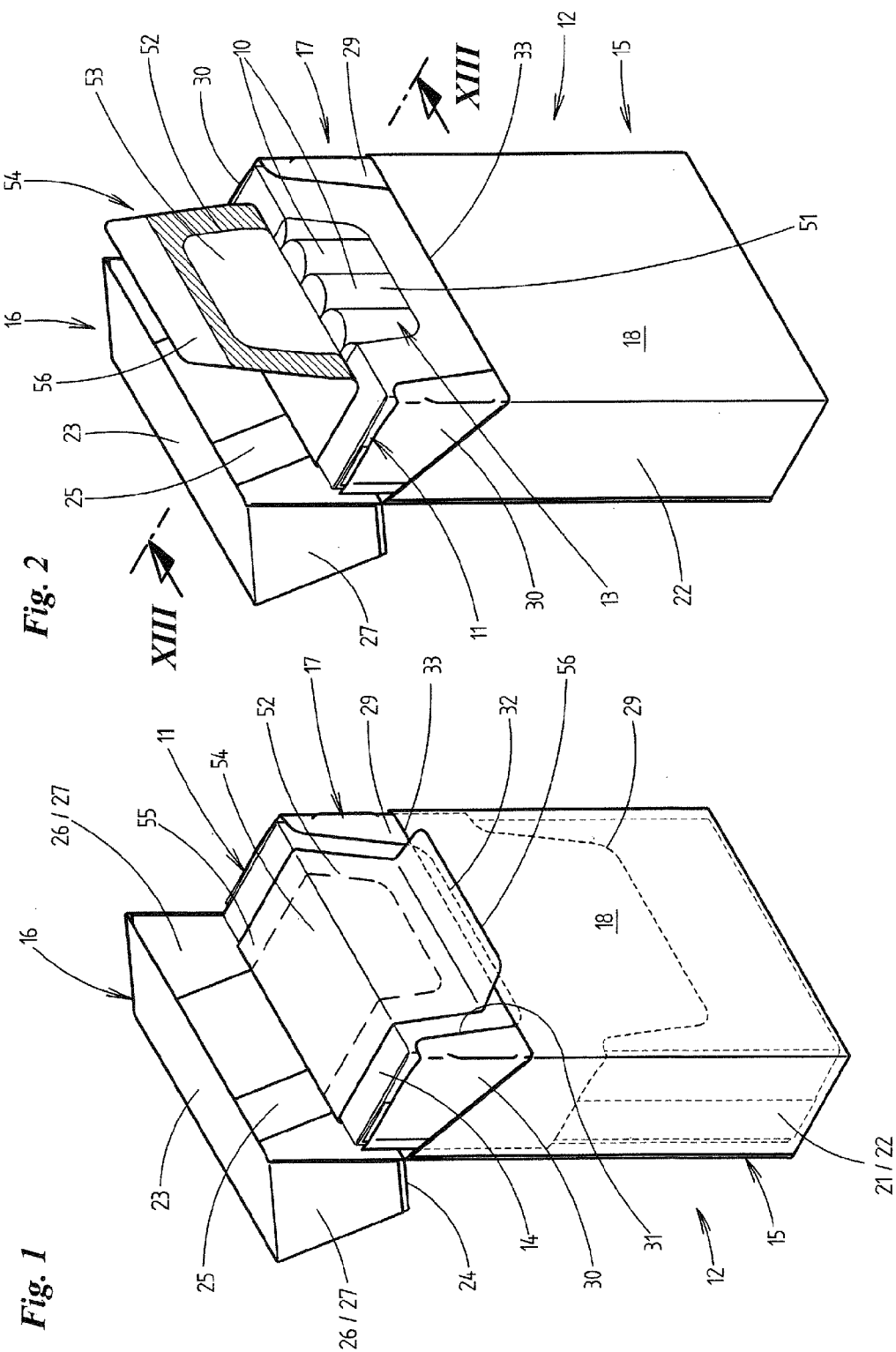

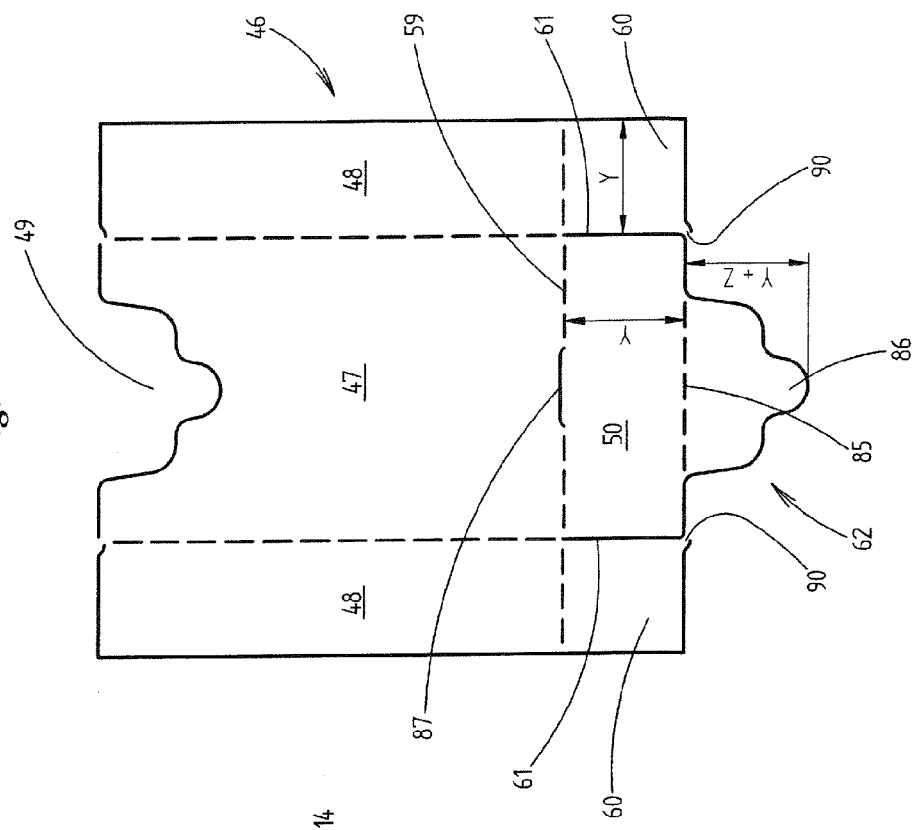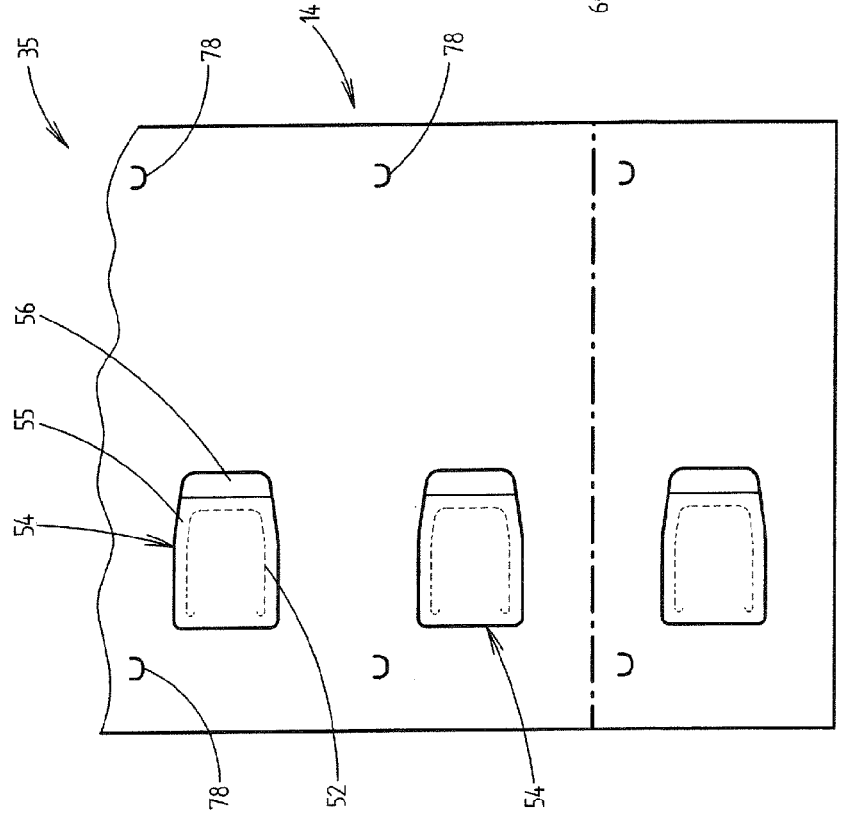

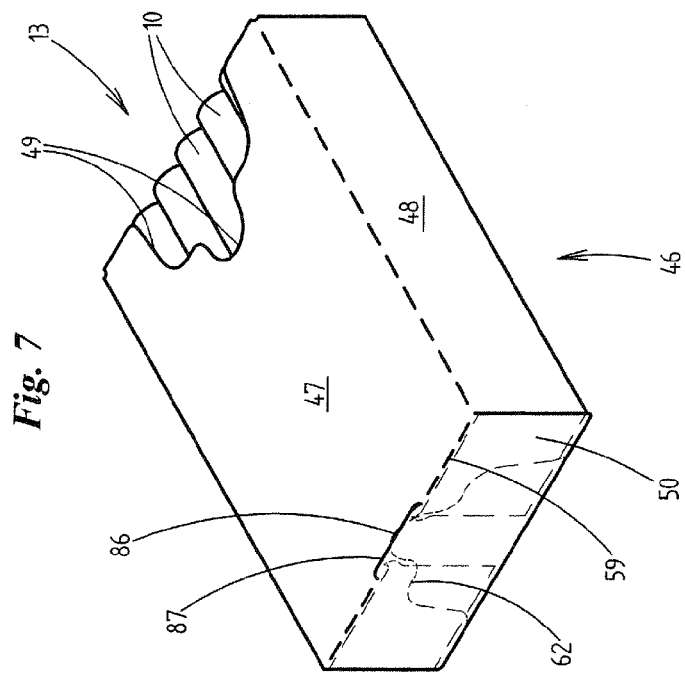
Fig. 7
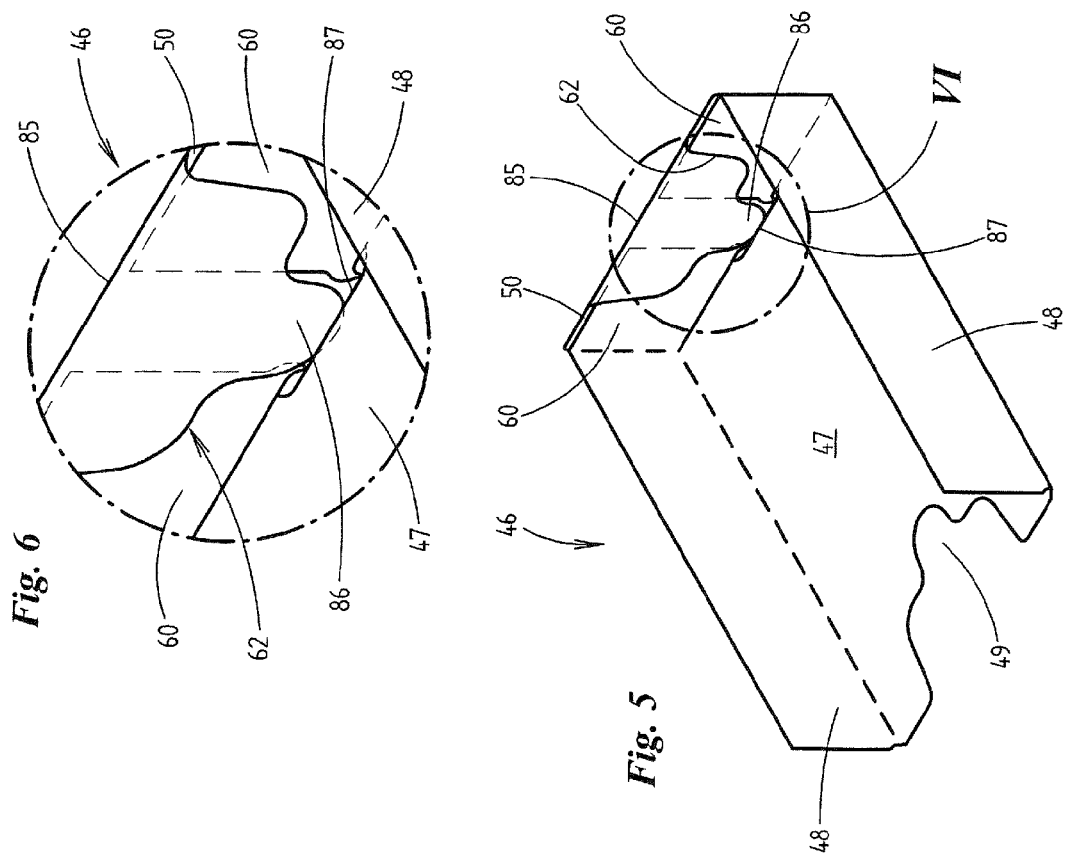
Fig. 6
Fig. 5

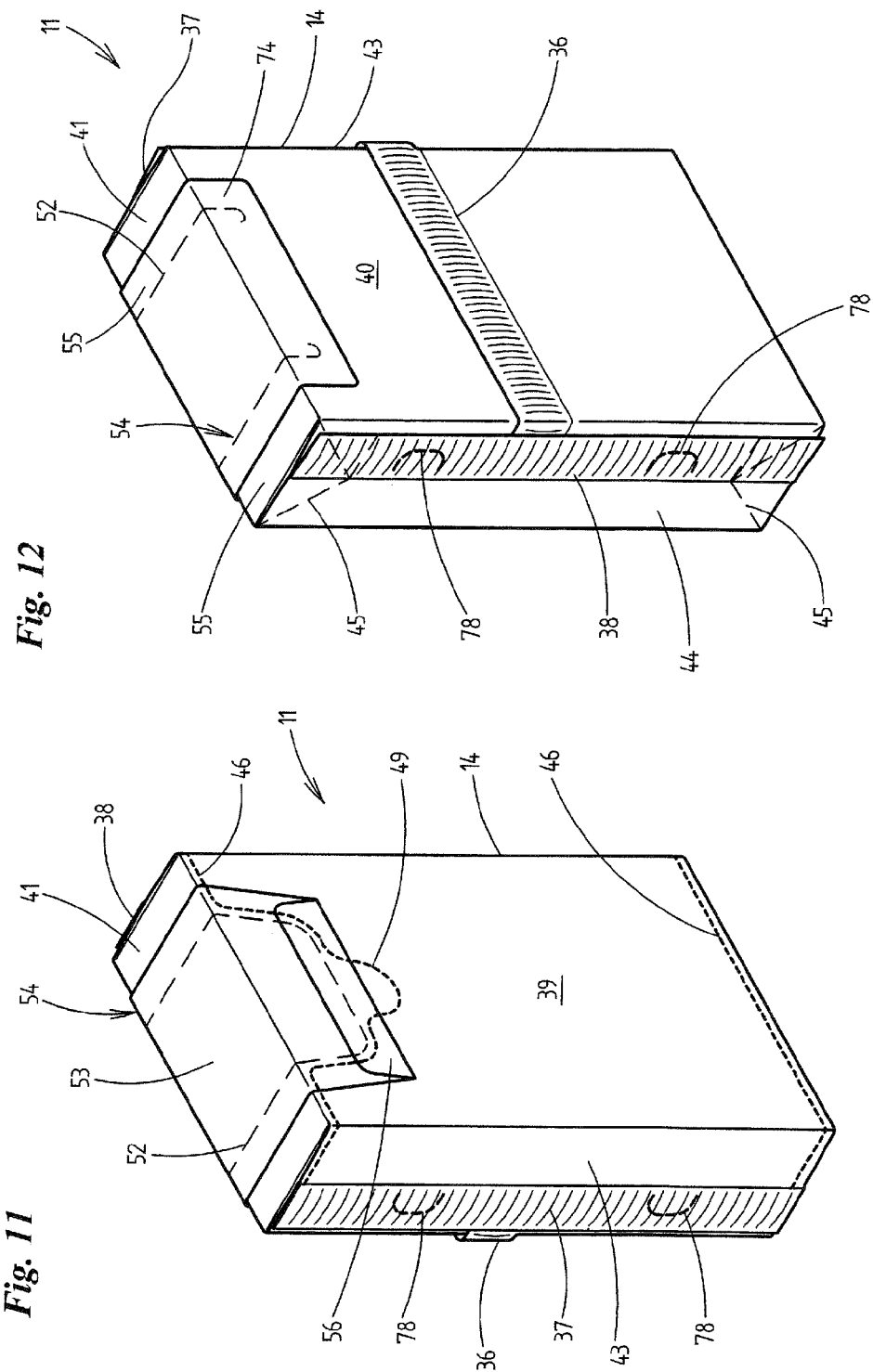

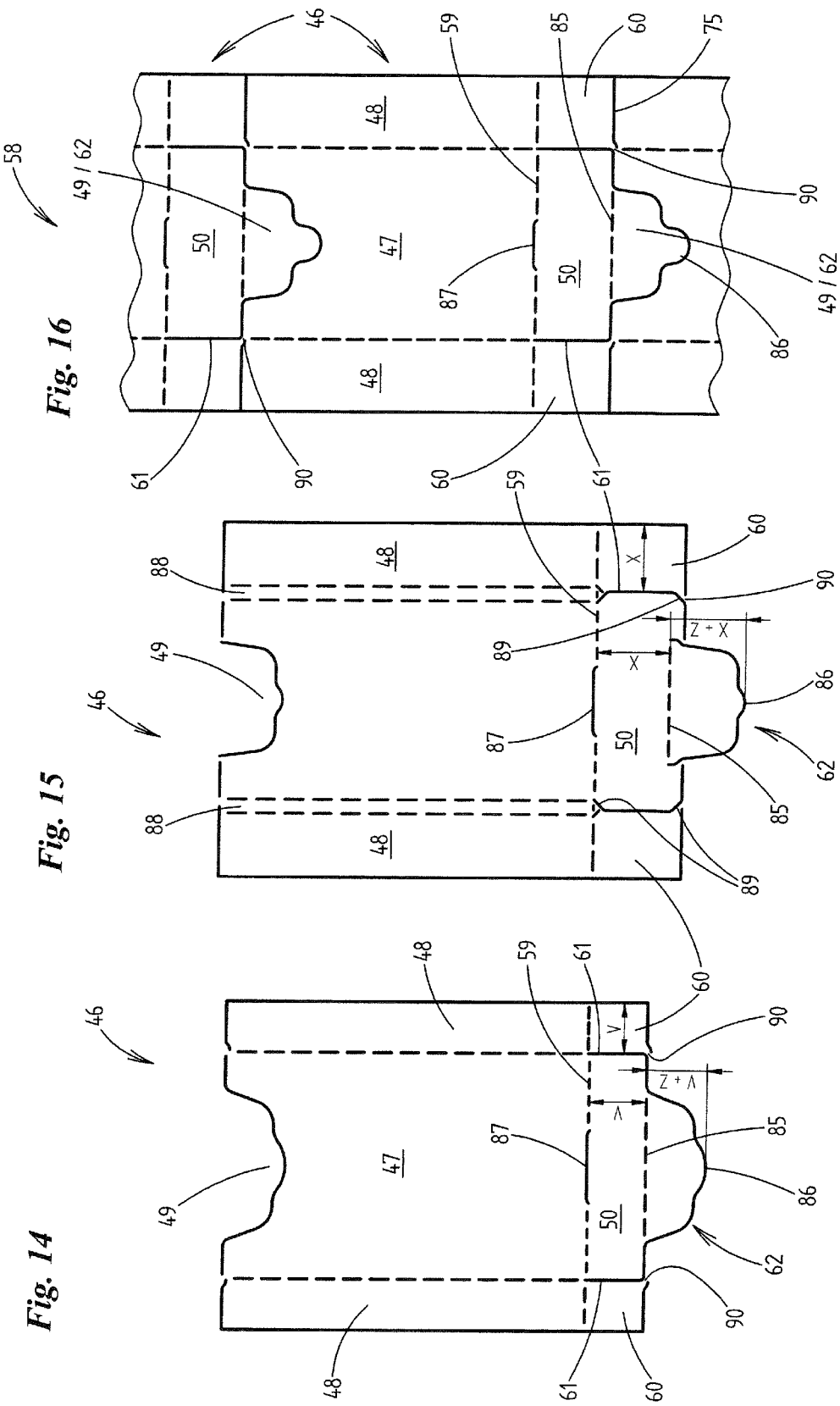

PACKAGE FOR CIGARETTES, AND METHOD FOR PRODUCING SAME

STATEMENT OF RELATED APPLICATIONS

This patent application claims the benefit of International Patent Application No. PCT/EP2012/001802 having an International Filing Date of 26 Apr. 2012, which claims the benefit of German Patent Application No. 10 2011 115 504.3 having a filing date of 11 Oct. 2011 and of German Patent Application No. 10 2011 119 344.1 having a filing date of 25 Nov. 2011.

BACKGROUND OF THE INVENTION

Technical Field

The invention deals with packs for cigarettes comprising a dimensionally stable outer pack, in particular configured in the form a hinge-lid box, and also comprising an inner pack configured in the form of a sealed block with an inner wrapper made of preferably aroma-tight and moisture-tight, thermally sealable sheet material for wrapping a cigarette group and having an inner collar partially enclosing the cigarette group, wherein the sealed block, in the region of an end wall and of an adjacent end region of a front wall, has a removal opening with a closure label which can be used a number of times, covers over the removal opening in the closed position and is fixed on the sealed block by adhesive bonding by way of an all-round connecting periphery, and with methods of producing such packs.

Prior Art

Designing cigarette packs with a sealed block as contents is problematic because the complex packs are material-intensive and require additional outlay during production. Efforts have been directed toward designing the packs such that as far as possible conventional packaging machines can be used for production.

A particular theme is provided by the design and production of the sealed block. Unavoidable folding flaps should be connected to one another by sealing, without heat and pressure being transmitted to a harmful extent to the cigarettes. It is customary, therefore, to have a supporting part arranged within the sealed block (inner collar), as is disclosed and described, by way of example, in WO 2011/009520. The sealed block with an end opening structure which can be used a number of times is arranged within an essentially standard hinge-lid box (hinge lid pack).

Also known is a sealed pack for cigarettes configured in the form of a "flow pack", that is to say a tubular-bag pack (DE 10 2010 019 867 A1). The packs are produced in the form of a continuous tubular-bag strand with an opening unit applied in the region of a sheet-material web. The cigarettes, which are partially enclosed by an inner collar, are directed longitudinally along the tubular-bag strand. The pack designed in this way can be arranged in a (modified) hinge-lid box.

BRIEF SUMMARY OF THE INVENTION

The invention deals with the theme of cigarette packs with a sealed block. The object on which the present further development is based resides in a pack configuration which is more straightforward, but is effective for handling, and in an improved production method.

In order to achieve this object, the pack according to the invention is a pack for cigarettes, comprising a dimensionally stable outer pack, in particular configured in the form a hinge-lid box, and also comprising an inner pack configured in the form of a sealed block with an inner wrapper made of preferably aroma-tight and moisture-tight, thermally sealable sheet material for wrapping a cigarette group and having an inner collar partially enclosing the cigarette group, wherein the sealed block, in the region of an end wall and of an adjacent end region of a front wall, has a removal opening with a closure label which can be used a number of times, covers over the removal opening in the closed position and is fixed on the sealed block by adhesive bonding by way of an all-round connecting periphery, characterized by the following features:

a) the inner wrapper of the sealed block, in the region of an inner rear wall, has a continuous connecting seam which extends over the entire width—transversely to the cigarettes—of the sealed block and is configured in the form of a fin seam; and b) continuous closure seams configured in the form of fin seams are arranged on two mutually opposite narrow block surfaces, that is to say on inner side walls; and c) connecting flaps of the fin seams are positioned against the respectively associated wall of the sealed block, as are triangular or trapezoidal projections in the region of the closure seams.

The rear fin seam—connecting seam—extends over the entire width of the inner rear wall, including a sub-region of the inner side walls, that is to say as far as the preferably approximately centrally arranged closure seams running (in an upright state) on the inner side walls. The opening structure, that is to say the removal opening and closure label, is located in the upper region of the inner front wall and extends over the entire width of the end wall. The closure label is dimensioned, and arranged, such that a connecting limb is fixed in the region of the inner rear wall of the inner pack.

An inner collar is arranged within the sealed block (inner pack) in order to protect the cigarettes in relation to mechanical and thermal loading. The inner collar comprises at least a front wall or upper wall and side walls or supporting walls and a base part. Special measures are taken in order to ensure the three-dimensional, folded form of the inner collar, to be precise by virtue of corner flaps (of the lateral supporting walls) being fixed in the folded position by means of mechanical aids, in particular by virtue of the corner flaps in abutment against the base part being secured in a form-fitting manner.

A particular method of producing the packs or the inner packs (sealed block) is a method of producing packs for cigarettes, comprising an outer pack configured in the form of a hinge-lid box, and also comprising an inner pack configured in the form of a sealed block for accommodating a cigarette group and having an inner collar partially enclosing the cigarette group, wherein the inner pack consists of a preferably aroma-tight and moisture-tight, thermally sealable sheet material which, in the region of an inner end wall and of an adjacent end region of an inner front wall, has a removal opening with a closure label which can be used a number of times and covers over the removal opening in the closed position, characterized by the following features:

a) during wrapping of the cigarette group in the longitudinal direction of the cigarettes, a continuous sheet-material web in the width of a blank for the inner pack is provided, in an off-center region, with punching lines for an opening tab of the inner pack and with a closure label, which covers over the region of the punching line, and is then fed continuously to a sheet-material station;

b) in the region of the sheet-material station, units made up of a cigarette group and an inner collar partially enclosing the same are fed one after the other, with the upper wall directed upward, along a conveying path, wherein the cigarettes of the cigarette group are oriented transversely to the conveying direction;

c) the prepared sheet-material web is positioned approximately centrally on the successive units, such that the removal opening with opening tab, the opening being defined by the punching line, is located in the region of a recess of the upper wall of the inner collar;

d) the sheet-material web is folded around the successively transported pack units to form a tubular wrapper, wherein peripheral strips of the sheet-material web are brought together beneath the movement plane of the pack unit;

e) in a first sealing station—longitudinal sealing station—, the peripheral strips of the sheet-material web are connected to one another by thermal sealing to form a continuous fin seam, that is to say a connecting seam;

f) the tubular sheet-material web with the pack units is then fed to a second sealing station, that is to say a transverse sealing station, in which, in the region between successive pack units, the layers of the sheet-material web are connected to one another to form transversely directed closure seams and, at the same time, a central severing cut is executed between the closure seams;

g) at the same time or thereafter, the fins of the closure seams are folded over against the inner side walls;

h) in the region of a downstream collar station, blanks of the pack collars of the outer pack are fed transversely to the pack path of the inner packs and are positioned on the upper side of the same, to be precise outside the region of the closure label;

i) then collar side walls of the pack collar are folded over against the inner side walls; and j) finally, the finished inner pack with pack collar is pushed into a partially folded outer pack, which is open in the region of a lid, and said outer pack is then folded definitively.

BRIEF DESCRIPTION OF THE DRAWINGS

Further details and features of the packs and of the measures for producing the same will be explained hereinbelow with reference to the drawings, in which:

FIG. 1 shows a perspective illustration of a (cigarette) pack with the lid open, FIG. 2 shows, likewise in perspective, the pack according to FIG. 1 with a sealed block, as pack contents, open, FIG. 3 shows a portion of the material web for inner or sheet-material blanks of the sealed block, FIG. 4 shows a spread-out blank of an inner collar, FIG. 5 shows a perspective view from the rear and beneath of an inner collar of a blank according to FIG. 4 which has been folded in a manner appropriate for the pack, FIG. 6 shows, on an enlarged scale, a detail VI from FIG. 5, FIG. 7 shows a perspective illustration from the front and top of the folded inner collar with a cigarette group, FIG. 11 shows a perspective view from the front of a sealed block, FIG. 12 shows a perspective view from the rear of the sealed block from FIG. 8, FIG. 14 shows a spread-out blank for a different embodiment of inner collar, FIG. 15 shows a further exemplary embodiment of a blank with an inner collar, and FIG. 16 shows a detail of a material web for producing blanks for inner collars configured according to FIG. 4.

DETAILED DESCRIPTION OF PREFERRED EMBODIMENTS

Figure 8:
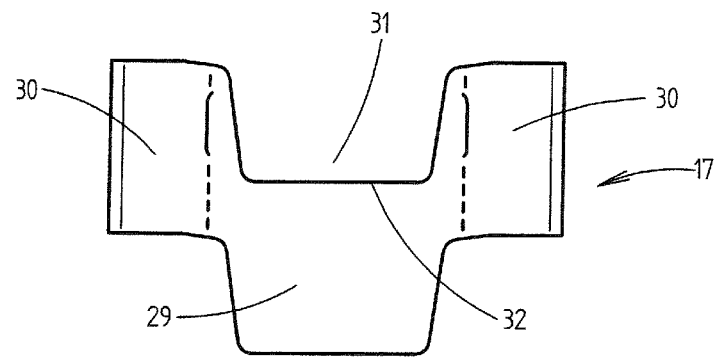
FIG. 8 shows a spread-out blank for a pack collar.

Sealed packs for cigarettes 10 (or other aroma-sensitive smoking articles) comprise an inner pack 11 and an outer pack 12. The inner pack is a sealed block, that is to say a cigarette group 13 which is enclosed by an inner wrapper 14 made of aroma-tight and moisture-tight, sealable sheet material, possibly in a number of layers, to form a pack unit which is sealed in relation to external influences. The outer pack 12 should be designed largely in the form of a standard cigarette pack made of (thin) cardboard or similar packaging material, in the present case a hinge-lid box with a box part 15 and lid 16. The hinge-lid box 12 has a collar, that is to say a pack collar 17, which comprises a separate blank. Said pack collar, as known in principle, is arranged in the box part 15 and projects partially out of the same. The pack collar 17 encloses the inner pack 11.

Figure 9:
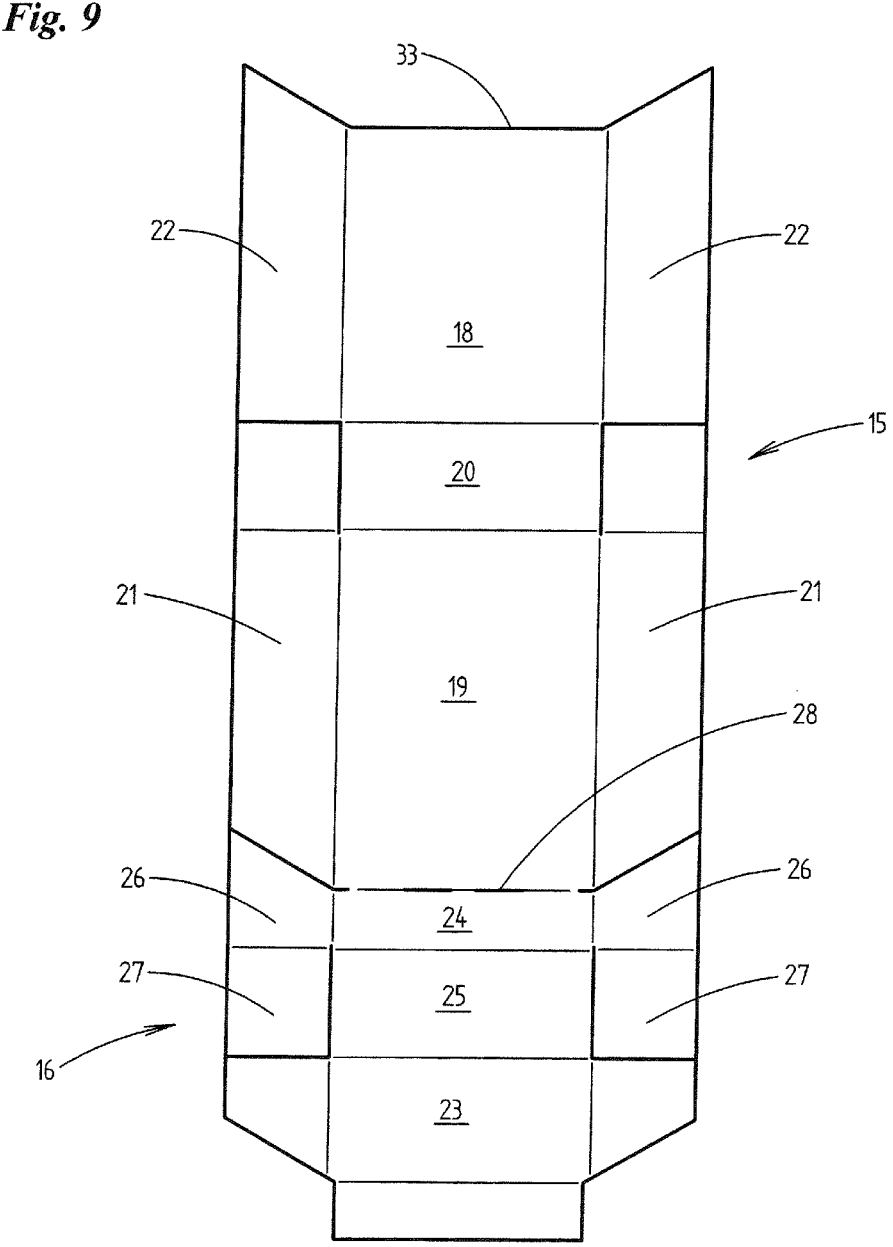
FIG. 9 shows a blank for an outer pack configured in the form of a hinge-lid box.

The outer pack 12 configured in the form of a hinge-lid box is produced from a blank according to FIG. 9. The box part 15 comprises a box front wall 18, box rear wall 19 and a base wall 20. Narrow (upright) side walls are formed from (inner and outer) side flaps 21, 22, which are connected to one another by adhesive bonding.

In an analogous manner, the lid 16 comprises a lid front wall 23, lid rear wall 24, an upper end wall 25 and (inner and outer) lid side flaps 26, 27. The latter form double-layered lid side walls in continuation of the side walls 21/22 of the box part. The latter is connected in one piece to the lid 16 by a transversely directed linear articulation 28 between the box rear wall 19 and lid rear wall 24.

The collar or pack collar 17 (FIG. 8) comprises a collar front wall 29 and collar side walls 30. The collar front wall 29 is provided with a recess 31 which, in the lower region, is bounded by a transverse edge 32. One special feature resides in the fact that the recess 31 is larger or deeper than is usually the case, that is to say such that the transverse edge 32 is located level with, or beneath, a closing edge 33 of the box part 15.

The inner pack 11 has an inner wrapper 14 which encloses the cigarette group 13 on all sides and is made of a sheet-material blank 34. The latter is severed from a continuous sheet-material web 35 (folded to form a tubular structure) and forms a sealed block which is closed on all sides and has a (large-surface-area) inner front wall 39, an inner rear wall 40 located opposite, an upper inner end wall 41, a lower inner base wall 42 and narrow, upright inner side walls 43, 44. A connecting seam 36 is preferably arranged on the rear side, that is to say in the region of the inner rear wall 40, to be precise in the transverse direction (transversely to the longitudinal orientation of the cigarettes 10). Closure seams 37, 38 are each arranged in the region of narrow, mutually opposite walls of the inner pack 11, that is to say in the region of the (upright) inner side walls 42, 44, preferably (approximately) in the center thereof.

Figure 13:
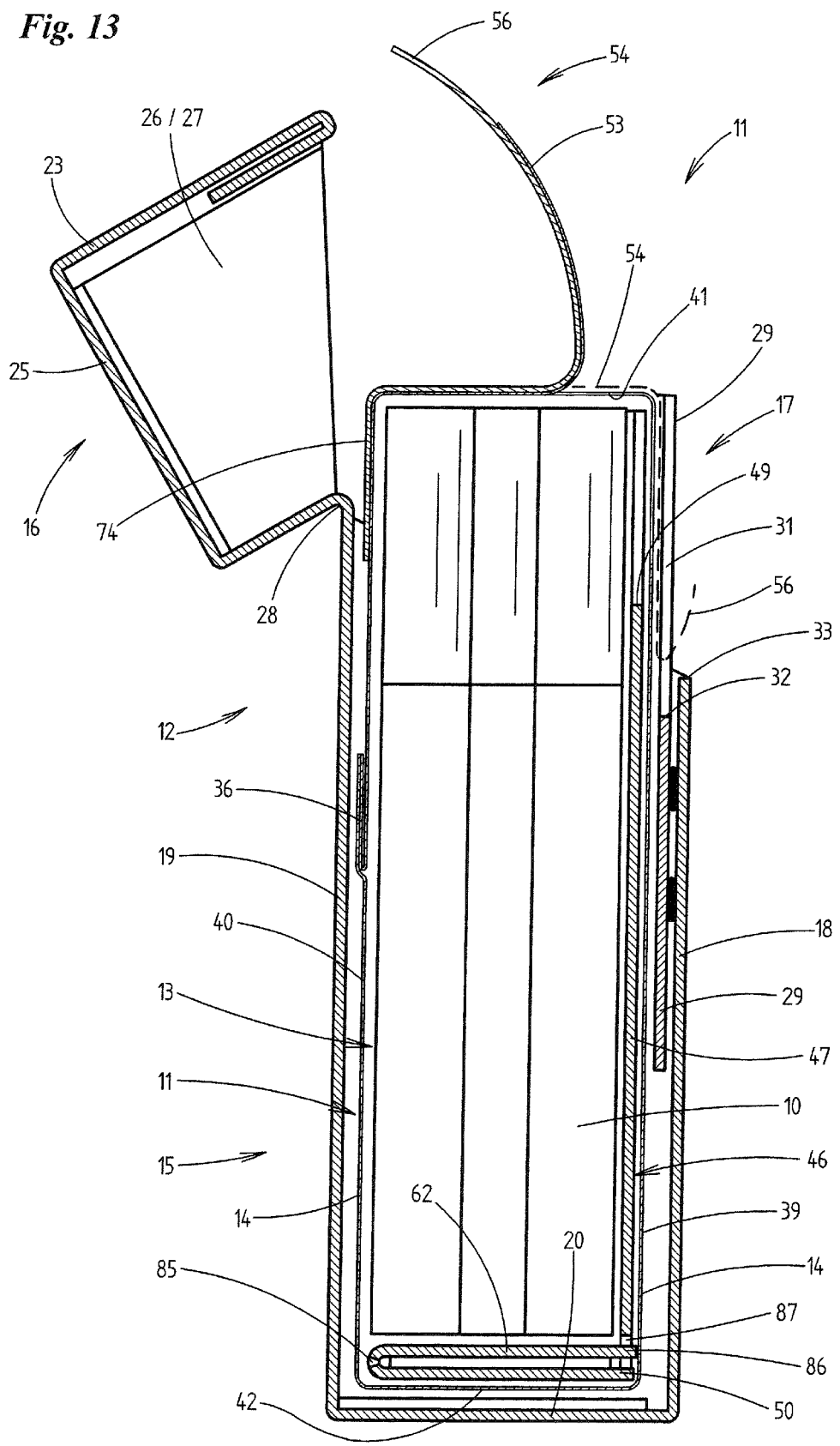
FIG. 13 shows, on an enlarged scale, a vertical section (XIII-XIII) taken through the pack according to FIG. 2.

Double-walled sealing flaps or fins produced during production of the seams 36, 37, 38 are folded over against the respective pack wall, butt against the same and are connected thereto if appropriate (thermally). In the case of the transversely directed connecting seam 36, the interconnected fins are folded preferably upward (in the direction of the inner end wall 41—FIG. 13).

The folding and sealing produce projections 45 at the ends of the lateral closure seams 37, 38, which are designed in the form of fin seams. These projections each include a triangular gusset of the wrapper and a rectangular endpiece of the fin seam. The projections 45 are folded downward in the region of the inner wall 41 (for abutment against the inner side wall 43, 44), and are folded upward in the region of the inner base wall 42. This folded position means that the projections 45 are covered by the pack collar and/or by the side walls of the outer pack 12. An advantageous solution, however, is the one which is shown in FIGS. 11 and 12 and in which the projections 45 have been folded inward, during production of the sealed block, into a position between the inner side walls 43, 44, on the one hand, and a supporting mechanism within the sealed block, on the other hand.

This supporting mechanism within the inner pack 11 is in an inner collar 46 and consists of (thin) cardboard or similar material which can be subjected to mechanical and thermal loading. The inner collar 46 can be severed in the form of a separate blank preferably from a continuous material web, preferably a specifically designed collar web 58 according to FIG. 16. The inner collar 46 basically comprises a front wall or upper wall 47, side walls or lateral supporting walls 48 and a base wall or a collar base 50, which can be folded, along a folding line 59, into a position in which it is transverse to the upper wall 47 (FIGS. 5-7). The lateral supporting walls 48 are also erected or folded transversely, and therefore the folded inner collar 46 is of drawer-like design and covers the cigarette group 13 on four sides.

Special measures are provided in order to stabilize the folded position of the inner collar 46. Corner flaps 60 are formed in continuation of the lateral supporting walls 48. These corner flaps are delimited from the collar base 50 by a punching line 61 and connected to the lateral supporting walls 48 such that they can be folded via a folding line in extension of the folding line 59. In the folded position, the corner flaps 60 butt against the inside of the erected collar base 50.

The three-dimensional folded position of the inner collar 46 is stabilized in that the corner flaps 60 are fixed in the folded position. In the present case, mechanical clamping or retaining means are used for this purpose. According to FIG. 4, a retaining tab 62 is connected to the collar base 50 in the form of a continuation of the same. The retaining tab 62 can be folded, along a folding line 85—preferably parallel to the folding line 59—, into the retaining position for the corner flaps 60, that is to say into a position with abutment against the (folded) corner flaps 60 (FIGS. 5 and 6). During folding of the inner collar 46, accordingly, the corner flaps 60 are folded against the inside of the collar base 50 in the first instance on account of a series of folding steps. Then the retaining tab 62 is folded, and fixed, against the corner flaps 60. In the present case, the retaining tab 62 is designed in the form of an insertion tab with a preferably central continuation or an insertion tongue 86. The latter is introduced into a retaining slot 87, which is arranged in the region of the folding line 59, in particular on account of a shallow C-shaped punching formation. The dimensioning is such that the insertion tongue 86, in the form of an appropriately dimensioned protrusion with an endpiece, enters into the retaining slot 87 and thus fixes the retaining tab 62.

Particular dimensioning of the folding flaps means that the corner flaps 60 are fixed predominantly in a form-fitting manner in the folded position (FIGS. 5-7). This is possible when the width Y of the corner flaps 60 corresponds essentially to the width Y of the collar base 50. Including the protrusion or insertion tongue 86, the retaining tab 62, which is folded along the folding line 85, has dimensioning Y+Z, where Z defines the insertion depth of the insertion tongue 86. This adhesive-free connection retains the lateral supporting walls 48 and the collar base 50 in a stable manner in the erected position.

The inner collar 46 extends preferably over the entire height or longitudinal dimension of the inner pack 11. On the side which is directed toward the inner end wall 41, the upper wall 47 forms a recess 49, as is customary in a collar. In terms of contour and dimensioning, the recess 49 corresponds to the retaining tab 62, including the insertion tongue 86.

Alternative forms of the inner collar 46, which differ in respect of specific details, are illustrated in FIGS. 14 and 15. In the case of the first-mentioned embodiment, the lateral supporting walls 48 are of very narrow design (for "slim" cigarettes). The dimensions V of the collar base 50 and of the collar flaps 60 are correspondingly narrow. The retaining tab 62 is adapted in shape, in particular in dimensioning, that is to say it is dimensioned with a relatively large width—in the direction of the folding line 85—in order to ensure sufficient covering of the narrow corner flaps 60 in the folded position thereof. The insertion depth is marked Z.

The inner collar 46 according to FIG. 15 is intended for embodiments with a contoured collar edge 88, that is to say for embodiments with round edges or oblique edges. FIG. 15 shows the last-mentioned embodiment, in which the obliquely directed collar edge is defined by two parallel individual edges. The collar base 50 is adapted thereto, that is to say is provided with oblique corners 89, in other words is of octagonal contour overall.

The retaining tab 62 is designed, and connected to the collar base 50, in a particular manner, that is to say with a folding line 85 which is set back in relation to an outer, free peripheral edge of the collar base 50. An appropriate punching formation frees the retaining tab 62 in relation to the collar base 50 as far as the folding line 85. The particular configuration of the collar edges 88 means that the corner flaps 60 have a width X which is smaller than the given overall width of the collar base 50. The folding line 85 is offset, and this therefore ensures, between the folding lines 59 and 85, a distance which corresponds to the width X of the corner flaps 60 and results in precise form-fitting anchoring of the corner flaps 60. The retaining tab 62 here is designed such that a relatively large (covering) surface is available for the corner flaps 60, and only a small (central) insertion tongue 86.

A further special feature of the inner collars 46 results from production. The corner flaps 60 are each connected via residual connections 90 to the collar base 50, the rest of which is severed from the corner flaps 60 by the punching line 61. The residual connections 90 formed (on either side) are important during production of the inner collars 46 from a continuous material web or collar web (FIG. 16). A punching blade for the region of the collar base needs to be continuous, for production purposes. This conflicts with the transverse punching formation 75 for delimiting the corner flaps 60 in relation to the subsequent blank for an inner collar 46. The residual connections 90 are produced, in the case of a rectangular design of the collar base 50, by an appropriately contoured severing blade for the transverse punching formation 75. Once the material web (FIG. 16) has been punched (to completion), the connection between adjacent blanks 46 (and between the collar base 50 and corner flaps 60) is maintained. Severing of adjacent blanks 46 takes place expediently by way of downstream severing rollers with slightly different conveying speeds, in which case the blanks for the inner collar 46 are severed by being torn off from the web 58.

The sealed block or the inner pack 11 is provided with a removal opening 51 which can be closed a number of times. This opening is bounded by a corresponding punching formation, in the present case by a U-shaped punching line 52, in the sheet material or inner wrapper 14. The punching line 52 encloses a correspondingly designed opening tab 53 in the form of part of the inner wrapper 14. The opening tab 53 is covered by a closure label 54, which can be fixed, by way of a free connecting periphery 55, in particular using (permanent) adhesive over the entire surface area, on a region which encloses the removal opening 51. The closure label 54 has an adhesive-free grip tab 56 on the free (lower) periphery. This grip tab is gripped manually in order for the closure label 54 to be actuated (opened or closed).

The punching line 52, and thus the removal opening 51, can extend, as shown, in the upper part of the inner front wall 39, along the inner end wall 41 and in an adjacent peripheral region of the inner rear wall 40. The closure label 54 is designed, and arranged, correspondingly. A connecting limb 74 fixes the closure label 54 in the region of the inner rear wall 40.

The inner pack 11 is positioned in the outer pack 12 such that the closure label 54 is located with the adhesive-containing region—connecting periphery 55—above the closing edge 33 of the box front wall 18 (FIG. 1). The grip tab 56 projects beyond the closing edge 33 and—once the pack has been opened for the first time—butts, in the closed position, against the outside of the box front wall 18 (FIG. 1). In the initial position, prior to the pack being opened for the first time, the grip tab 56 is preferably in a folded-over state (dashed lines in FIG. 13) and is concealed by the lid front wall 23 in the closed position of the lid 16. On account of the particular configuration of the pack collar 17—lower-level transverse edge—in the region of the recess 31, the outside of the inner wrapper 14 is largely free for the closure label 54, such that, in the closed position of the closure label 54, the grip tab 56 butts against the outside of the box front wall 18.

Figure 10:
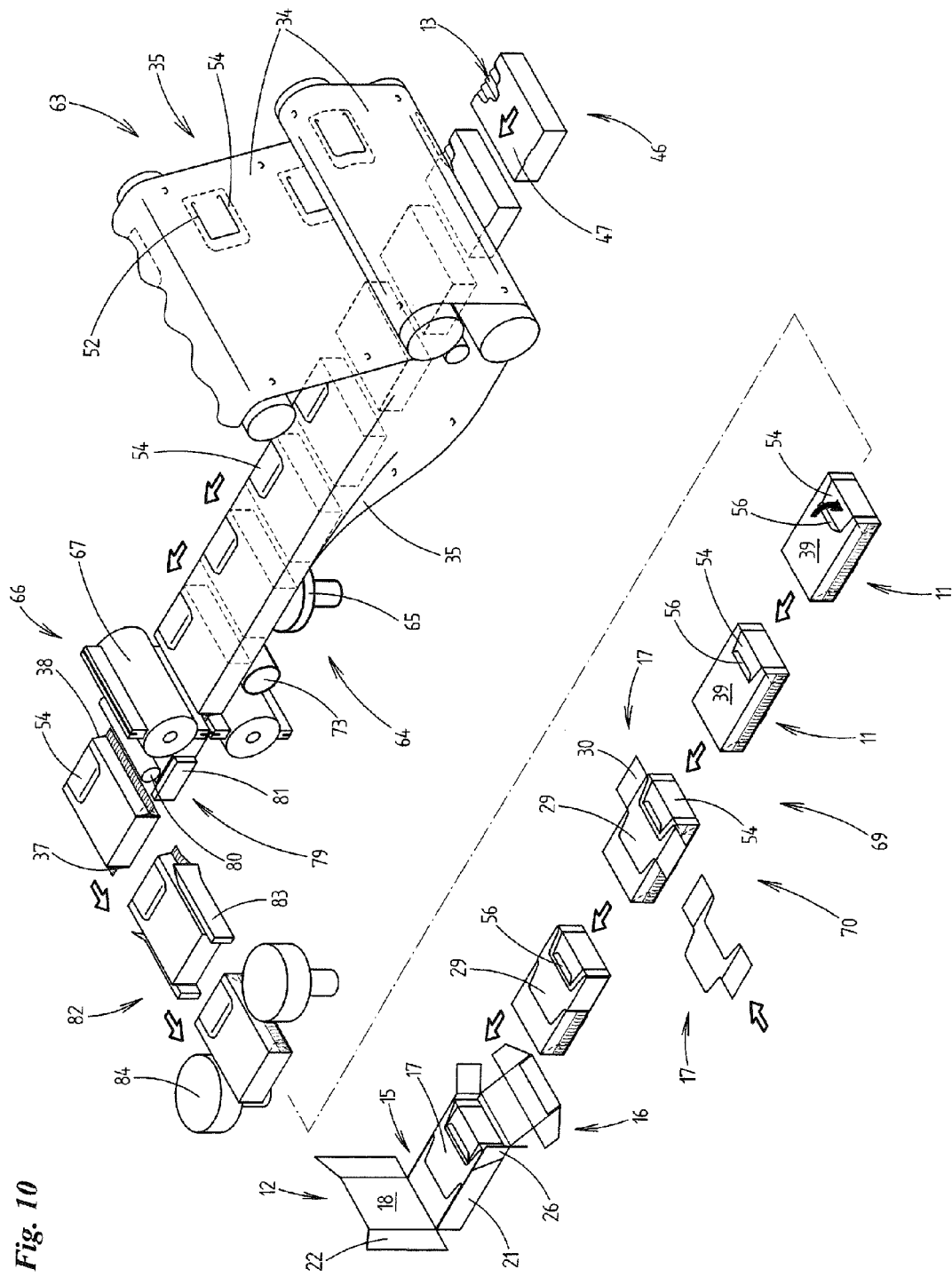
FIG. 10 shows, in perspective, a schematic illustration of the process for producing a pack according to FIGS. 1 and 2.

The operations of producing inner packs 11 and of combining these with an outer pack 12 are illustrated schematically in FIG. 10. The sheet-material web 35, which is prepared elsewhere, is fed to a sheet-material station 63. Units made up of a cigarette group 13 and a folded inner collar 46 are fed, with the upper wall 47 oriented upward, along a pack path. The units 13/46 have the cigarettes 10 oriented transversely to the conveying direction.

Prior to transfer to the unit 13/46, the sheet-material web 35 is provided with the U-shaped punching line 52 for the opening tab 53, to be precise likewise in a transversely directed relative position. The closure label 54 is positioned on the outside or upper side of the sheet-material web 35, in the region of the punching line 52, and connected thereto by adhesive bonding, in a manner offset in relation to the longitudinal center plane of the sheet-material web 35, this being in line with the imminent folding process.

The sheet-material web 35 prepared in this way is positioned, during continuous transportation, on the upper side of the successive units 13/46, to be precise such that the opening aid 52, 54 is located in the region of the sideways-directed recess 49 of the upper wall 47.

The sheet-material web 35, of appropriate width, is folded around the successive units 13/46 by appropriate guide mechanisms, and therefore the units 13/46 are located in a tubular structure formed by the sheet-material web 35. In a downstream longitudinal sealing station 64, the longitudinal peripheries of the sheet-material web 35, these being produced continuously on the underside of the movement path, are sealed by sealing mechanisms to form the connecting seam 36. For this purpose, rotating, disk-like sealing wheels 65 are arranged beneath the movement path. These are immediately followed by a mechanism for continuously folding over the initially projecting, interconnected peripheral flaps of the connecting seam 36 (fin seam) running in the longitudinal direction of the sheet-material web 35. A pressure-exerting roller 73 folds over the connecting seam 36 as the sheet-material web 35 advances.

The tubular sheet-material web 35 with the units 13/46 wrapped therein then passes into a second sealing station, that is to say a transverse sealing station 66. The sealing mechanisms which become active here are ones which apply transversely directed closure seams 37, 38 for two successive inner packs 11 at the same time in one operating cycle. The distances between the units 13/46 are selected such that the adjacent closure seams 37, 38 produced in a waste-free manner and, at the same time, a severing cut is applied between the two, centrally in the region corresponding to wide (double) sealing seams. The sealing mechanisms of the transverse sealing station 66 are designed in the form of sealing rollers 67 with radially projecting sealing jaws 68 and central severing blades. Sealing mechanisms or sealing rollers 67 are arranged above and beneath the sheet-material web 35 and are controlled such that lower and upper sealing jaws 68 take effect at the same time, in which case the two layers of the fin seams are connected (approximately) halfway up the units 13/46, and severed at the same time, in a short sealing cycle.

One special feature resides in the fact that, during production of the closure seams 37, 38 or thereafter, the closed sealed block—inner pack 11—is vented. For this purpose, the inner wrapper 14 is provided with venting openings 78. In the present case, these are designed in the form of a U-shaped punching formation and are applied to the sheet-material web 35 when the latter is in the non-folded, planar state. The venting openings 78 are located in a region which is closed, or concealed by material layers, when the inner pack 11 is in the finished state. In the present case, the (U-shaped) venting openings 78 are adjacent to the two longitudinal peripheries of the sheet-material web 35, such that the venting openings 78 are arranged in the region of a rear half of the inner side walls 43 and/or 44, alongside the closure seams 37, 38. Once the sealed block has been closed (completely), the venting is carried out, that is to say air is directed away from the inner pack 11 via the free openings 78. Thereafter, the fins of the closure seams 37, 38 are folded over (in the direction of the rear side), and therefore the venting openings 78 are covered over. (Thermal) fixing of the closure seams 37, 38 provides for full sealing of the sealed block in the region of the venting openings 78.

The air from the sealed block 11 can be directed away by suction extraction. In the present case, the air is channeled away mechanically, that is to say by the application of pressure, via the venting openings 78. The transverse sealing station 66 is followed by a venting station 79. The air is pushed out of the inner pack with the aid of pressure-exerting mechanisms, which take effect on a plurality of surfaces of the inner pack 11. In the present case, a venting roller 80 takes effect on the upper side (inner front wall 39) and/or on the underside. Pressure-exerting mechanisms, that is to say, in the present case (transversely movable) venting rails 81, likewise take effect laterally, these applying the venting pressure to the sideways-directed surfaces—end surface 41 and base surface 42.

In a subsequent operating step, the flaps of the closure seams 37, 39 are folded over into the described position. For this purpose, the inner packs 11 are conveyed through a (transversely directed) folding and sealing station 82. In a first step, the fins of the closure seams 37, 38 (said fins being located laterally, as seen in the conveying direction) are folded over by folding mechanisms, that is to say fixed-location folding rails 83 on either side of the movement path of the inner packs 11. This is followed by sealing mechanisms taking effect in order to seal the folded fins onto the inner side walls 43, 44. Sealing rollers 84 are used for this purpose. The folding and sealing station 82 is assigned to a transversely directed conveying portion of the inner packs 11 following the transverse sealing station 66. A special feature is realized in respect of the projections 45 of the closure seams 37, 38. The latter—as an alternative to being folded over against the inners side walls 43, 44—are folded inward, that is to say into a position between the inner side walls 43, 44, on the one hand, and the inner collar 46 or the lateral supporting walls 48, on the other hand. The visible closure seams 37, 38 thus extend over the entire height of the inner side walls 43, 44 and terminate (approximately) flush with the inner end wall 41 and the inner base wall 42 (FIGS. 11 and 12).

Then the inner packs 11—possibly by being deflected again—are transferred into a pack path 69, in which the inner packs 11—with the cigarettes oriented in the conveying direction—are transported with the inner base wall 42 located at the front (FIG. 10). The grip tab 56 of the closure label 54, which is located in the rear region on the upper side, is folded over through 180° counter to the transporting direction until it butts against the free part of the closure label 54, and this gives the arrangement which is shown in FIG. 11. The dimensioning here is such that the opening tab 53, which is bounded by the punching line 52, is smaller (in the region of the inner front wall 39) than the recess 49 of the inner collar 46. The closure label 54, in contrast, is dimensioned to be larger than the contour of the recess 49.

In the region of a downstream collar station 70, prefabricated blanks of the pack collar 17 are fed in the transverse direction and positioned precisely on the upper side of the inner packs 11, such that the closure label 54, including the grip tab 56, is located within the recess 31 of the pack collar 17.

The operation of folding the pack collar 17 is completed by the collar side walls 30 being positioned on the inner side walls 43, 44. The sealed block (inner pack 11) completed in this way is then introduced into a partially folded outer pack 12 configured in the form of a hinge-lid box. The latter is located in a pocket of a folding turret in such a relative position that the side which is directed toward the lid 16 is open and, opposite this, the base wall 20 has been erected along with the box front wall 18 and side flaps. The inner side flaps 21 and lid side flaps 26 are also in the erected state. Accordingly, the sealed block—including the pack collar 17—can be introduced in a conventional manner into the outer pack 12 and the latter can then be completed. A conventional packaging machine for hinge-lid boxes can be used for this essential task.

LIST OF DESIGNATIONS

10 Cigarette
11 Inner pack
12 Outer pack
13 Cigarette group
14 Inner wrapper
15 Box part
16 Lid
17 Pack collar
18 Box front wall
19 Box rear wall
20 Base wall
21 Side flap
22 Side flap
23 Lid front wall
24 Lid rear wall
25 End wall
26 Lid side flap
27 Lid side flap
28 Linear articulation
29 Collar front wall
30 Collar side wall
31 Recess
32 Transverse edge
33 Closing edge
34 Sheet-material blank
35 Sheet-material web
36 Connecting seam
37 Connecting seam
38 Closure seam
39 Inner front wall
40 Inner rear wall
41 Inner end wall
42 Inner base wall
43 Inner side wall
44 Inner side wall
45 Projection
46 Inner collar
47 Upper wall
48 Supporting wall
49 Recess
50 Collar base
51 Removal opening
52 Punching line
53 Opening tab
54 Closure label
55 Connecting periphery
56 Grip tab
57 Label periphery
58 Collar web
59 Folding line
60 Corner flap
61 Punching line
62 Retaining tab
63 Sheet-material station
64 Longitudinal sealing station
65 Sealing wheel
66 Transverse sealing station
67 Sealing roller
68 Sealing jaw
69 Pack path
70 Collar station 71 Peripheral flap
72 Peripheral flap
73 Pressure-exerting roller
74 Connecting limb
75 Transverse punching formation
78 Venting opening
79 Venting station
80 Venting roller
81 Venting rail
82 Folding and sealing station
83 Folding rail
84 Sealing roller
85 Folding line
86 Insertion tongue
87 Retaining slot
88 Collar edge
89 Oblique corner
90 Residual connection

What is claimed is:

1. A pack for cigarettes (10), comprising a dimensionally stable outer pack (12), in particular configured in the form of a hinge-lid box, and also comprising an inner pack (11) configured in the form of a sealed block with an inner wrapper (14) made of preferably aroma-tight and moisture-tight, thermally sealable sheet material for wrapping a cigarette group (13) and having an inner collar (46) partially enclosing the cigarette group (13), wherein the inner pack (11), in the region of an inner end wall (41) and in an adjacent region of an inner front wall (39), has a removal opening (51) with a closure label (54) which can be used a number of times, comprising:
   a) the inner collar (46) of the inner pack (11) has at least one front wall or upper wall (47), lateral supporting walls (48), and a collar base (50);
   b) the inner collar (46) has a longitudinal dimension, in particular in the region of the upper wall (47), corresponding essentially to a corresponding dimension or height of the inner pack (11);
   c) the upper wall has a recess (49) in a region facing the removal opening (51) of the inner pack;
   d) the lateral supporting walls (48) and the collar base (50) are fixed in a folded position, namely by abutment against the cigarette group (13), in particular by additional folding flaps which ensure a form-fitting and/or force-fitting retaining position;
   e) corner flaps (60) arranged on the supporting walls (48) in continuation of the supporting walls (48); and
   f) a retaining tab (62), an insertion tongue (86), and a retaining slot (87),
   wherein an arrangement, on a free periphery of the collar base (50), of the retaining tab (62) which, in the folded position in abutment against the inside of the collar base (50), fixes the corner flaps (60), in the folded position, in a form-fitting manner, in particular by plug-in connection, that is to say by virtue of the insertion tongue (86), which is connected to the retaining tab (62), being introduced into the retaining slot (87) in the region of a folding edge or folding line (59) between the upper wall (47) and the collar base (50).

2. The pack as claimed in claim 1, wherein the corner flaps (60) are connected to a corner region of the collar base (50) via residual connections (90), wherein the residual connections (90) can be severed when the folding flaps are being erected.

3. The pack as claimed in claim 1, wherein the corner flaps (60) in the folded position in abutment against the inside of the collar base (50) are partially covered by the retaining tab (62) and the insertion tongue (86) is configured as a continuation of the retaining tab (62) such that the insertion tongue (86) can be introduced into the retaining slot (87).

4. The pack as claimed in claim 3, wherein the insertion tongue (86) is configured as a central continuation of the retaining tab (62).

5. The pack as claimed in claim 1, wherein the recess (49) of the upper wall (47) corresponds in terms of contour and dimensioning to the retaining tab (62), including the insertion tongue (86), such that blanks for the inner collar (46) can be severed from a continuous material web in a waste-free manner.

6. The pack as claimed in claim 1, wherein the retaining slot (87) for receiving the insertion tongue (86) is configured as a C-shaped punching formation.

7. The pack as claimed in claim 1, wherein the inner wrapper (14) of the inner pack (11) comprises temporary venting openings (78), in particular U-shaped or C-shaped punching formations via which air can be directed away from the inner pack (11) when the inner pack (11) is finished and closed, wherein, once the inner pack (11) has been vented, the venting openings (78) are closed.

8. The pack as claimed in claim 7, wherein the venting openings are closed by virtue of fins of seams (36, 37, 38) being folded over.

9. A pack for cigarettes (10), comprising a dimensionally stable outer pack (12), in particular configured in the form of a hinge-lid box, and also comprising an inner pack (11) configured in the form of a sealed block with an inner wrapper (14) made of preferably aroma-tight and moisture-tight, thermally sealable sheet material for wrapping a cigarette group (13) and having an inner collar (46) partially enclosing the cigarette group (13), wherein the inner pack (11), in the region of an inner end wall (41) and in an adjacent region of an inner front wall (39), has a removal opening (51) with a closure label (54) which can be used a number of times, comprising:
   a) the inner collar (46) of the inner pack (11) has at least one front wall or upper wall (47), lateral supporting walls (48), and a collar base (50);
   b) the inner collar (46) has a longitudinal dimension, in particular in the region of the upper wall (47), corresponding essentially to a corresponding dimension or height of the inner pack (11);
   c) the upper wall has a recess (49) in a region facing the removal opening (51) of the inner pack;
   d) the lateral supporting walls (48) and the collar base (50) are fixed in the folded position, namely by abutment against the cigarette group (13), in particular by additional folding flaps which ensure a form-fitting and/or force-fitting retaining position;
   e) corner flaps (60) arranged on the supporting walls (48) in continuation of the supporting walls (48);
   f) the corner flaps (60) are delimited from the collar base (50) by punching lines (61) and folded via a folding line to butt against the inside of the collar base (50) when the collar base (50) is erected;
   g) the collar base (50) and the corner flaps (60) are fixed in a folded position on account of the form-fitting and/or force-fitting anchoring; and
   h) a retaining tab (62), an insertion tongue (86), and a retaining slot (87),
   wherein an arrangement, on a free periphery of the collar base (50), of the retaining tab (62) which, in the folded position in abutment against the inside of the collar base (50), fixes the corner flaps (60), in the folded position, in a form-fitting manner, in particular by plug-in connection, that is to say by virtue of the insertion tongue (86), which is connected to the retaining tab (62), being introduced into the retaining slot (87) in the region of a folding edge or folding line (59) between the upper wall (47) and the collar base (50).

10. The pack as claimed in claim 9, wherein the corner flaps (60) are connected to a corner region of the collar base (50) via residual connections (90), wherein the residual connections (90) can be severed when the folding flaps are being erected.

11. The pack as claimed in claim 9, wherein the corner flaps (60) in the folded position in abutment against the inside of the collar base (50) are partially covered by the retaining tab (62) and the insertion tongue (86) is configured as a continuation of the retaining tab (62) such that the insertion tongue (86) can be introduced into the retaining slot (87).

12. The pack as claimed in claim 11, wherein the insertion tongue (86) is configured as a central continuation of the retaining tab (62).

13. The pack as claimed in claim 9, wherein the recess (49) of the upper wall (47) corresponds in terms of contour and dimensioning to the retaining tab (62), including the insertion tongue (86), such that blanks for the inner collar (46) can be severed from a continuous material web in a waste-free manner.

14. The pack as claimed in claim 9, wherein the retaining slot (87) for receiving the insertion tongue (86) is configured as a C-shaped punching formation.

15. The pack as claimed in claim 9, wherein the inner wrapper (14) of the inner pack (11) comprises temporary venting openings (78), in particular U-shaped or C-shaped punching formations via which air can be directed away from the inner pack (11) when the inner pack (11) is finished and closed, wherein, once the inner pack (11) has been vented, the venting openings (78) are closed.

16. The pack as claimed in claim 15, wherein the venting openings are closed by virtue of fins of seams (36, 37, 38) being folded over.

\* \* \* \* \*